United States Patent
Crocker et al.

(10) Patent No.: US 10,703,552 B1
(45) Date of Patent: Jul. 7, 2020

(54) DRINK CONTAINER AND CONCENTRATE

(71) Applicants: Charlee Crocker, Stuart, FL (US); James P. Crocker, Stuart, FL (US)

(72) Inventors: Charlee Crocker, Stuart, FL (US); James P. Crocker, Stuart, FL (US)

(*) Notice: Subject to any disclaimer, the term of this patent is extended or adjusted under 35 U.S.C. 154(b) by 0 days.

(21) Appl. No.: 16/212,941

(22) Filed: Dec. 7, 2018

Related U.S. Application Data

(60) Provisional application No. 62/595,875, filed on Dec. 7, 2017.

(51) Int. Cl.
| | | |
|---|---|---|
| *B65D 25/08* | (2006.01) | |
| *B65D 81/32* | (2006.01) | |
| *A47J 43/27* | (2006.01) | |
| *B01F 3/08* | (2006.01) | |

(52) U.S. Cl.
CPC .......... *B65D 81/3211* (2013.01); *A47J 43/27* (2013.01); *B01F 3/08* (2013.01); *B01F 2003/0896* (2013.01); *B01F 2215/0022* (2013.01)

(58) Field of Classification Search
CPC ............ B65D 81/3211; B65D 81/3216; B65D 81/3222; A47J 43/27; B01F 3/08; B01F 2003/0896; B01F 2215/0022
USPC ................. 206/219, 220, 222, 568
See application file for complete search history.

(56) References Cited

U.S. PATENT DOCUMENTS

| | | | | |
|---|---|---|---|---|
| 5,980,959 A * | 11/1999 | Frutin | ............. | B65D 85/73 206/222 |
| 6,056,142 A * | 5/2000 | Elliott | ............. | B65D 47/0804 215/228 |
| 6,152,296 A * | 11/2000 | Shih | ............. | B65D 51/2835 206/222 |
| 7,249,690 B2 * | 7/2007 | Smith | ............. | B65D 51/2835 206/219 |
| 7,896,155 B2 * | 3/2011 | Seelhofer | ............. | B65D 51/2835 206/219 |
| 2002/0170834 A1 * | 11/2002 | Lee | ............. | B65D 81/3222 206/221 |
| 2007/0023299 A1 * | 2/2007 | Clarkson | ............. | B65D 51/2835 206/219 |
| 2010/0258457 A1 * | 10/2010 | Seelhofer | ............. | B65D 51/2821 206/222 |
| 2011/0272301 A1 * | 11/2011 | Saulle | ............. | B65D 51/2807 206/219 |
| 2011/0284402 A1 * | 11/2011 | Sharp | ............. | B65D 51/2835 206/222 |

* cited by examiner

*Primary Examiner* — Luan K Bui
(74) *Attorney, Agent, or Firm* — McHale & Slavin, P.A.

(57) ABSTRACT

A liquid drink concentrate dispensing system is provided. It includes a concentrate storage container and a housing with a piercing device for providing a flow path for selective discharge of drink concentrate into a cup for diluting with water. The storage container includes a pump to effect selective discharge of the concentrate.

11 Claims, 2 Drawing Sheets

DRINK CONTAINER AND CONCENTRATE

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 62/595,875, entitled "DRINK CONTAINER AND CONCENTRATE", filed Dec. 7, 2017. The contents of the above referenced application is incorporated herein by reference in its entirety.

FIELD OF THE INVENTION

The present invention relates to a container system storing a drink concentrate, usable to both store and dispense a liquid drink concentrate into a drinking cup for mixing with a diluent, such as water, to form a dilute drink mixture.

BACKGROUND OF THE INVENTION

Concentrated drink mixes are well known in the art. They typically utilize a liquid mixture of flavor, sweetener (usually a high intensity low calorie sweetener) and colorant. They are food approved by the FDA when sold in the United States, both packaging and consumable product. One such product currently on the market is branded MIO and generically referred to as "liquid water enhancer". It contains a dispensable liquid containing flavor, sweetener, color and liquid like water, with the flavor, sweetener and color preferably being soluble and/or dispersible in the liquid to reduce separation of the ingredients during storage. The mixture of ingredients is contained in a polymeric squeeze bottle that has a removable threaded lid closure. Consumable contents are about 1-2 ounces. For use, the bottle must be inverted to effect dispensing. While effective, it cannot be reliably positioned relative to a container of water and, if used while traveling, bouncing can cause one to splatter some of the contents onto the user and/or surrounding area. This will cause at least temporary staining and wetting.

DESCRIPTION OF THE PRIOR ART

Concentrated liquid drink mix is sold in squeeze bottles. The bottles tend to be small, e.g., 1-2 ounces in net contents. These bottles require aiming to use and a guess at how much to dispense to make a flavored drink.

SUMMARY OF THE INVENTION

The present invention provides an improved dispenser system for discharging a flavored liquid from its storage container.

Accordingly, it is a primary objective of the instant invention to provide a liquid container system that utilizes a container for storing flavored liquid that can be coupled to a storage housing having a piercing device operable to form a discharge outlet in the storage container.

It is a further objective of the instant invention to provide a storage container that has a pump associated with the storage container that can discharge a fixed amount of container contents with one operation cycle. Each complete pump cycle can distribute a relatively equal amount of liquid contents.

It is yet another objective of the instant invention to provide a container system that has separable components, allowing the liquid storage container to be exchanged for a new one when empty.

It is a still further objective of the instant invention to provide such a container system with means to reduce the risk of discharge of liquid contents during storage.

Other objects and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Figure 1:
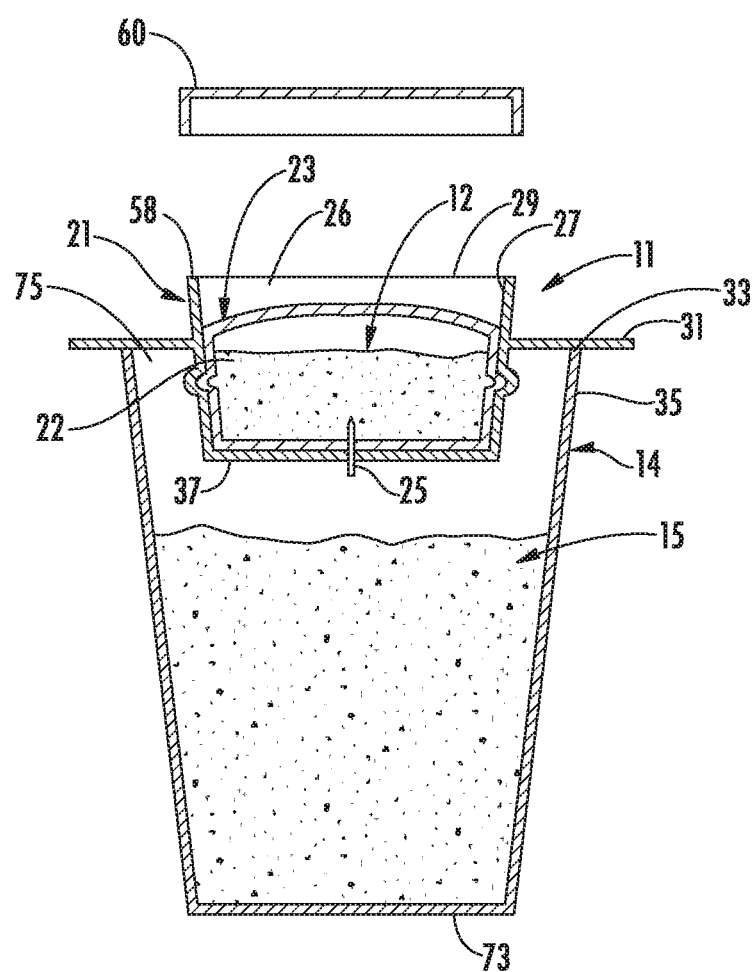
FIG. 1 is a side sectional view of the concentrate container system on a drinking cup.
Figure 2:
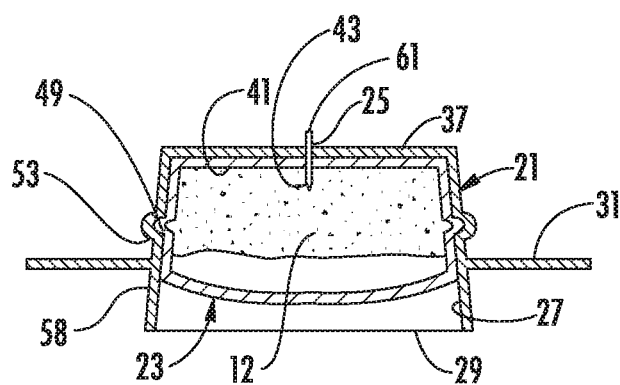
FIG. 2 is a sectional view of the concentrate container system of FIG. 1 without the drinking cup and shown inverted for piercing.
Figure 3:
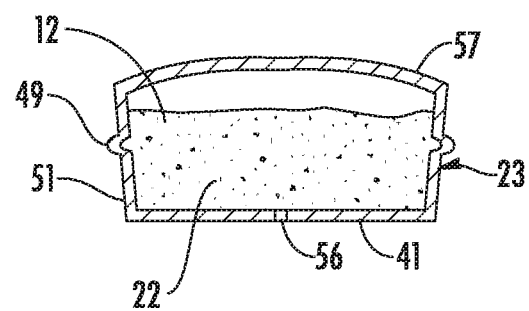
FIG. 3 is a sectional view of the concentrate container of FIG. 2.

FIG. 1 illustrates a concentrate container system, designated generally 11, for use in dispensing a liquid drink concentrate, designated generally 12, into a drinking cup, designated generally 14. The liquid drink concentrate 12 is dispensed from the system 11 into the cup 14 for mixing with water or other liquid, designated generally 15, in the cup 14. The container system 11 includes a storage housing 21 in which a storage container 23 is positioned and retained for use. A dispenser 25 is provided for discharge of the concentrate 12 from a concentrate storage chamber 22 of the container 23 into the cup 14.

The container system 11 includes both the housing 21 and container 23. As shown, the housing 21 has a storage receptacle 26 defined by a generally frustoconical sidewall 27 with an open top 29. Position terms such as top and bottom are used herein in the sense of when the item is in its normal use position, as seen in FIG. 1. A laterally extending support flange 31 extends from the sidewall 27 for engagement with the top edge 33 of the sidewall 35 of the cup 14. Preferably, the flange 31 and housing 21 are of an integral molded structure, preferably from a food approved polymeric material such as polyethylene or polypropylene. The housing 21 also includes a bottom wall 37 that is shown as generally planar, but could be concave on the outside to provide clearance for the dispenser 25, which is secured to the bottom wall 37. The dispenser 25 is preferably configured to provide a piercing spike that, in operation, will extend through a bottom wall 41 of the container 23. To facilitate piercing, the dispenser 25 has its free end 43 in the shape of a point. In a preferred embodiment, the housing 21 and container 23 are configured for releasably locking the two together when the housing 21 contains the container 23 for use. As shown, this locking can be provided by the container 23 having a laterally outwardly extending rib 49 extending around the periphery of the sidewall 51 of the container 23. Preferably, the exterior of the sidewall 51 and the interior of the sidewall 27 have matching contours, with both being frustoconical. As shown, the sidewall 27 has an outwardly extending groove 53 extending around its periphery and positioned for receipt of the rib 49 therein to releasably lock the container 23 within the housing 21 for use of the container system 11.

The container 23 includes the sidewall 51 as described above. It also includes the bottom wall 41 that, prior to piercing, closes the bottom of the container 23. The container 23 also includes a top wall 57, normally closing the top of the container 23. The container 23 can be formed as an integral assembly or can have a portion thereof, for example the sidewall 51 and a top wall 57, joined together after forming and filling with concentrate 12, as by heat sealing. The bottom wall 41 is preferably provided with a suitable seal member 56 adapted for receiving the pointed free end 43 of the dispenser 25 therethrough, and forming a seal therewith during normal use to prevent leakage of the concentrate 12 from the container 23. The seal 56 is shown as part of the bottom wall 41. In an alternative embodiment, the seal 56 could include an elastic member adhesively secured to the bottom wall 41 and covering a hole through the bottom wall until the dispenser 25 penetrates through it. The seal 56 can be provided with a formed aperture to allow for filling the container 23 with the concentrate 12.

The container 23 is provided with means to effect selective intentional discharge of the concentrate 12 from the container 23 into the cup 14. One way of effecting discharge is by pumping. One such pumping means is to have the top wall 57 concave on the inside and convex on the outside, forming a flexible dome. Pressing of the top wall 57 would thus pressurize the interior of the container 23 to effect discharge of the concentrate 12 through the dispenser 25. Upon release of the force applied to the top wall 57 to effect dispensing by a user, the top wall has sufficient resiliency to resume its normal position as described above. This would effect discharge of a predetermined amount of concentrate 12. While the disclosed top wall 57 functions as a pump, it is to be understood that other forms of pumps could be provided. One such type of pump would be a corrugated tubular member, preferably mounted to a generally planar top wall 57, which would also function to dispense concentrate 12, and then draw in air on the reverse movement thereof. In a preferred embodiment, the housing 21 can be provided with an upwardly extending shield member 58 that extends beyond the wall 57. As shown, the shield member 58 is in the form of a ring. The shield member 58 is useful to reduce the risk of accidental pumping during storage of the container system 11 as assembled. An over cap 60 could also be provided to fit over the shield member 58.

The dispenser 25 is shown in the form of a conduit having a sharp end 43 for piercing the container 23 at the seal 56. The dispenser 25 has a through aperture 61 through which concentrate 12 can be discharged into the cup 14. In a preferred embodiment, the aperture 61 can have a small enough transverse cross-sectional area to maintain the concentrate 12 within the container 23, providing the interior pressure of the container 23 is substantially equal to the pressure on the exterior of the container 23. The aperture 61 forms a flow communication channel between the storage chamber 22 and the exterior of the housing 21 for dispensing into the cup 14. It is also to be understood that a valving system could be provided, utilizing two one-way valves; one for allowing discharge of the concentrate 12, and one for the ingress of air after discharging of the concentrate so that the pressure inside the container 23 is again substantially equal to its exterior pressure. A duck bill style valve system could also be used, which allows concentrate to flow out and air to flow in while forming a seal when there is little or no pressure differential. A slit in an elastic membrane could also be used. Spring loaded ball valves can also be used.

The concentrate 12 would typically include liquid like water, an intense sweetener like aspartame, one or more flavors, artificial and/or natural, and one or more color additives to color the mixture. These are well known in the art. Preferably, the color additives, sweetener and flavor(s) are soluble in the liquid.

The cup 14 can be any size or shape. As shown, the cup has a sidewall 35 and a bottom wall 37 that is preferably integral with the sidewall 35. The cup 14 can be constructed by molding a polymeric material such as polyethylene or polypropylene, or a mixture of polymers. The polymer(s) need to be food approved for the type of anticipated concentrate 12. Preferably, the cup 14 has a storage volume capacity of about 6-32 fluid ounces. The sidewall 35 defines an open top 75 for receipt of the housing 21 therein.

The container system 11 can be provided to consumers in a kit form. A kit would include a housing 21, one or more containers 23 and the over cap 60. The filled containers 23 can be sold as refills. The kit could also include a cup 14. The kit would be packaged with operating instructions and descriptive product information.

In use, the container 23 is positioned in the housing 21 such that the dispenser 25 is adjacent the wall 41, but not through the wall 41. The container 23 is then moved generally longitudinally in the housing 21 to have the dispenser penetrate the wall 41 through the seal 56 to allow flow communication therethrough for the drink concentrate.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A drink concentrate container system for dispensing drink concentrate into liquid to form a liquid drink, said system including:
   a housing having a storage receptacle formed at least partially by a first bottom wall connected to a first sidewall and an open top;
   drink concentrate;
   a non-pressurized concentrate container movably positioned in the receptacle and a storage chamber containing said drink concentrate therein, said concentrate container having a second bottom wall connected to a second sidewall with said second bottom wall overlying said first bottom wall and being adjacent thereto; and
   a dispenser operatively associated with said first bottom wall and being operable to selectively penetrate said second bottom wall upon movement of said second bottom wall toward said first bottom wall and provide a flow communication channel with said storage chamber for discharge of said drink concentrate from said storage chamber;

a pump device associated with said concentrate container and operable to effect pump induced discharge of said drink concentrate from said storage chamber after said dispenser penetrates said second bottom wall.

2. The drink concentrate container system of claim 1 including a seal member associated with said second bottom wall operable to engage a portion of said dispenser when said second bottom wall is moved toward said first bottom wall to effect penetration of said second bottom wall by said dispenser.

3. The drink concentrate container system of claim 1 wherein said pump device includes a top wall connected to said second sidewall and forming a dome selectively movable into said storage chamber to induce flow of drink concentrate out of said storage chamber through said dispenser when the dispenser has penetrated said second bottom wall.

4. The drink concentrate container system of claim 3 wherein said top wall having a concave inner surface and a convex outer surface.

5. The drink concentrate container system of claim 1 wherein said housing having an outwardly projecting flange connected to said first sidewall and adapted to rest on top of a cup for discharge of drink concentrate into said cup.

6. The drink concentrate container system of claim 1 wherein said housing having a shield member associate with said first sidewall and projecting above said concentrate container.

7. The drink concentrate container system of claim 6 including an over cap removably mounted to said first sidewall.

8. The drink concentrate container system of claim 1 including means associated with said first and second sidewalls and operable to resist movement of said second bottom wall toward said first bottom wall.

9. The drink concentrate container system of claim 8 wherein said means including a rib or groove associated with an interior surface of said first sidewall and the other of a rib or groove associated with an outer surface of said second sidewall and said rib and groove being interengaged until movement of said second wall toward said first wall.

10. A kit for producing a drink from drink concentrate, the kit comprising:

a least one housing having a storage receptacle formed at least partially by a first bottom wall connected to a first sidewall and an open top;

drink concentrate;

at least one non-pressurized concentrate container movably positioned in a respective said receptacle and having a storage chamber containing said drink concentrate therein, said at least one concentrate container having a second bottom wall connected to a second sidewall with said second bottom wall overlying a respective said first bottom wall and being adjacent thereto; and at least one dispenser operatively associated with a said first bottom wall of a said respective first bottom wall and being operable to selectively penetrate a respective said second bottom wall upon movement of said respective second bottom wall toward a said respective first bottom wall and provide a flow communication channel with a respective said storage chamber for discharge of said drink concentrate from said respective storage chamber;

a pump device associated said concentrate container and operable to effect pump induced discharge of said drink concentrate from said storage chamber after said dispenser penetrates said second bottom wall.

11. The kit of claim 10 including a plurality of said housings, a plurality of said concentrate containers and a plurality of said dispensers.

\* \* \* \* \*